(No Model.)
J. M. STEARNS, Jr.
TELEPHONIC AND TELEGRAPHIC SYSTEM.
No. 248,115. Patented Oct. 11, 1881.
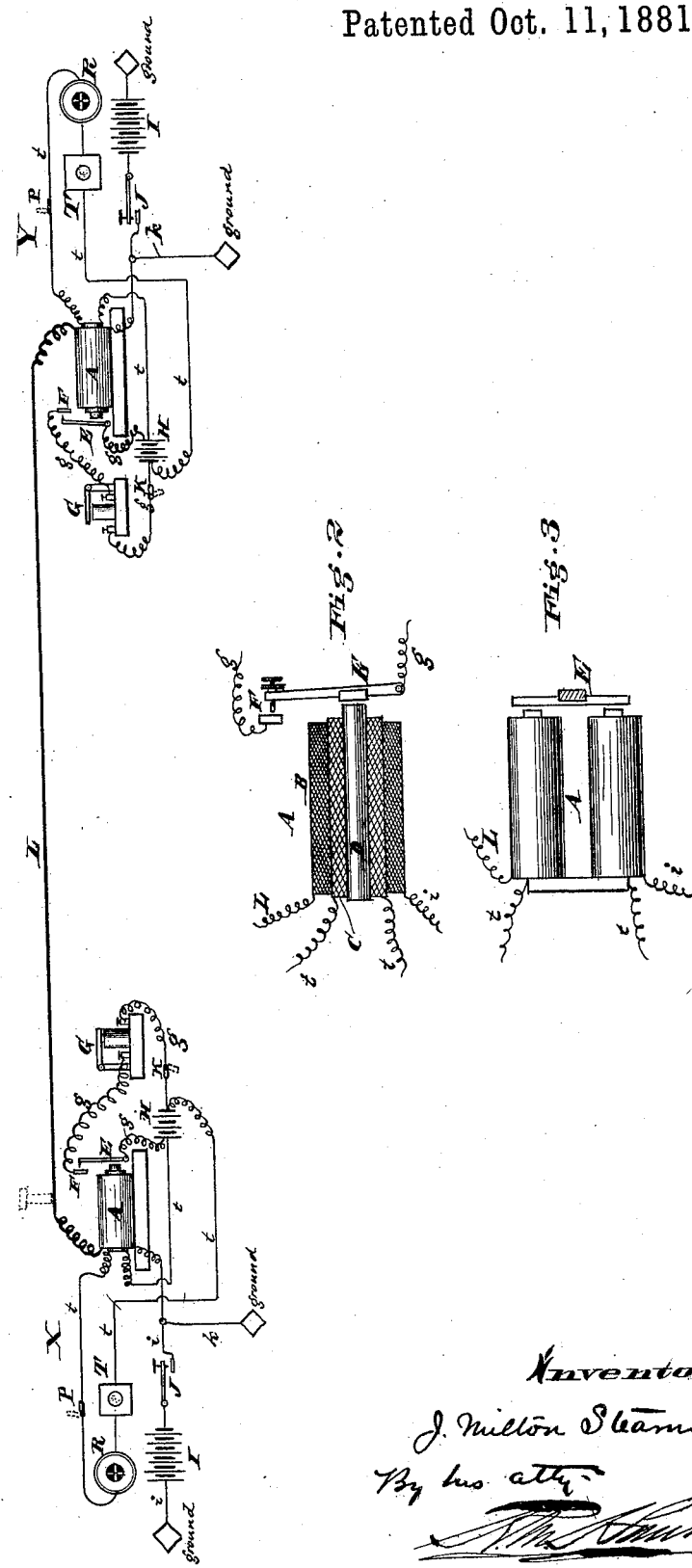

UNITED STATES PATENT OFFICE.

J. MILTON STEARNS, JR., OF BROOKLYN, NEW YORK.

TELEPHONIC AND TELEGRAPHIC SYSTEM.

SPECIFICATION forming part of Letters Patent No. 248,115, dated October 11, 1881.

Application filed June 6, 1881. (No model.)

*To all whom it may concern:*

Be it known that I, J. MILTON STEARNS, Jr., of the city of Brooklyn, county of Kings, and State of New York, have invented an Improvement in Telephonic and Telegraphic Systems, of which the following is a specification.

My invention relates to electrical apparatus in which both telephonic and telegraphic dispatches may be transmitted over a common wire; and my invention consists in forming the relays with cores and primary and secondary coils, the primary coils of which are in circuit with the local batteries and telephonic transmitters and receivers, and the secondary coils being connected to the line and main batteries and ground, whereby the line will be worked with high resistance, and the local circuit for the telephonic apparatus will be worked with low resistance; further, in details of construction and arrangement, all of which are set forth in the specification hereinafter, and shown in the accompanying drawings, which form part thereof.

The object of this invention is to combine a telephonic system with a telegraphic system in such a manner that either may be worked over a wire common to both, that the relay-coils may constitute the induction-coils of the telephonic apparatus, to enable telephones to be used on long and bad lines, and, finally, to enable telephonic communication in a telegraphic office without much expense.

In the drawings, Figure 1 represents the arrangement of the combined telegraph and telephone systems. Fig. 2 shows a section of the relay-coils. Fig. 3 shows a plan of a modified form of relay to correspond to the form now in use.

A are the relays, one of which is located at each station X and Y. These relays consist of a core, D, a primary coil of coarse wire, C, and a secondary coil of fine wire, B, and the usual armature, E, and contact-points F. One end of the secondary coil B is connected with the line L and the other end with the anvil of a Morse key, J, by wire $i$, said key when closed putting main battery I to line. The wire $i$ is connected to the ground by the wire $k$. The local telephonic circuit $t$ takes in the transmitter T, the receiver R, and local battery H, and connects the two ends of the coarse primary wire C of the relay. The sounder G is connected through the battery H, armature E, and contact-points F of the relay by wire $g$, which may be thrown in or out of action by a switch, K.

If desired, there may be two local batteries, one for the sounder and one for the telephones; but that is not necessary, as a simple battery, H, may work both sounder and telephones.

The operation is as follows: The switch K being closed, as shown in Fig. 1, the telegraph may be used. The action of the key J puts part of the current of the batteries I through the outer coil, B, of fine wire to line L, part passing to the ground by wire $k$. The current which goes to the line passes through coils B at both stations and to the ground by wire $k$ at the opposite station. A current is set up in the secondary coils B, which magnetizes the cores D and attracts the armatures E, making contacts at F and completing the local circuits and causing both sounders to respond.

To use the system for telephonic transmissions the switches K are opened, breaking the local-sounder circuits. Articulate sounds received in the transmitter R will cause currents from battery H, at station X, to pass through the local circuit $t$, which include the primary coil C of coarse wire. This induces a current in the secondary coil B, which passes down the line L, and after traversing the secondary coil at station Y passes to the ground by wire $k$. This induces a current in the primary coil C at Y station, which passes through the local telephone-circuit $t$ and actuates the receiving-telephone.

In practice it is preferable to use a switch, P, in the telephonic circuit $t$, which may be used to cut the transmitter and its circuit out of action when the telegraph is being used by opening the circuit through the primary wire of the induction-coil, and thereby preventing rattling of the transmitter-diaphragm. By cutting out the primary coil the core is directly magnetized by the current from the main battery passing through the outer or secondary coil on its way to line, as in the case of an ordinary relay.

In general practice it will hardly be necessary to cut the sounder out when using the telephone. If desired, the telephone-receiver may be placed in the main line and the transmitter in the local circuit.

By this simple arrangement a single line-wire may be used for both telephonic and telegraphic dispatches, and a high resistance in line and low resistance in the local circuits is obtained, which enable the telephones to be worked over bad lines.

A patent was granted to Day for a relay and sounder on October 6, 1868, but it was for a different purpose, and works in a different manner from my invention, and I claim nothing therein shown and described.

Having now described my invention, what I claim as new, and desire to secure by Letters Patent, is—

1. A combined telegraphic and telephonic system, which consists of a single line-wire provided at each extremity or station with a relay consisting of an induction-coil one pole of the outer or secondary coil of which is in connection with the line and the other pole with the telegraph-key, main battery, and ground, and the inner or primary wire or coil in circuit with the telephonic transmitter, receiver, and local battery, the core of said relay being adapted to control the sounder through the mediation of the relay-armature, local circuit, and battery, as and for the purpose specified.

2. A relay consisting of a central core of iron wrapped with two independent coils of wire, the outer one, of fine wire, being in circuit with the line and main battery and key and the inner one, of coarse wire, being in circuit with the local circuit containing the telephone-transmitter, in combination with an armature adapted to vibrate before the core to control the action of a sounder in a local circuit, and a telephone-receiver to receive and articulate sounds transmitted over the line by the action of the transmitter, as and for the purpose specified.

3. The combination of a relay consisting of the iron core D, primary coil C, of coarse wire, secondary coil B, of fine wire, and an armature to control a local circuit in which a sounder is located, said relay being arranged to either act as an ordinary relay or an induction-coil with a local telephone-circuit through the primary coil and local battery, a line-wire in circuit with the secondary coil, a battery in said line-wire one pole of which is grounded, a ground-wire from said line-wire between the battery and coil, and a make-and-break key located in the line-wire between the ground-wire and battery, as shown and described.

4. In a combined telephone and telegraph system, the combination of induction-coil relay A, line L, key J, main battery I, wire $k$, local circuit $t$, with its telephone-transmitter T and receiver R, armature E, controlling the local circuit $g$, with its sounder G, and local battery H, as and for the purpose specified.

5. In a combined telephonic and telegraphic system, an induction-coil relay, in combination with the main line and its battery and two local circuits and their batteries, one of said local circuits being provided with a sounder and controlled by means of the armature and core of the relay, said core being magnetized by a current passing through the secondary or outer coil of wire, the other of said local circuits being provided with a telephonic transmitter and in circuit with the primary wire of the induction-relay, substantially as and for the purpose specified.

6. In a combined telephonic and telegraphic system, the induction-coil having its primary coil in circuit with the transmitter, said circuit being provided with a switch and local battery, and the secondary coil having its ends connected with the line and ground, in combination with a sounder controlled by the passage of a current through said secondary coil, a main battery, and a key to put said battery to line, as and for the purpose specified.

In testimony of which invention I hereunto set my hand.

J. MILTON STEARNS, JR.

Witnesses:
JOHN M. STEARNS,
WM. B. DITMARS.